United States Patent [19]

Heider

[11] 4,162,388

[45] Jul. 24, 1979

[54] APPARATUS AND METHOD FOR SUBMERGED PERCUSSION WELDING

[75] Inventor: Erich E. Heider, West Allis, Wis.

[73] Assignee: Cutler-Hammer, Inc., Milwaukee, Wis.

[21] Appl. No.: 736,594

[22] Filed: Oct. 28, 1976

[51] Int. Cl.² ............................................. B23K 9/22
[52] U.S. Cl. ...................................... 219/96; 219/72; 219/95
[58] Field of Search ..................... 29/628; 219/72, 95, 219/96, 97, 118; 228/263

[56] References Cited

U.S. PATENT DOCUMENTS

| | | | |
|---|---|---|---|
| 1,608,825 | 11/1926 | Wagner | 219/95 |
| 1,779,563 | 10/1930 | Siebs et al. | 219/96 |
| 3,196,247 | 7/1965 | Piercy et al. | 219/72 |
| 3,327,087 | 6/1967 | Brumback, Jr. | 219/72 |
| 3,851,864 | 12/1974 | Miller | 219/121 P |
| 3,935,988 | 2/1976 | Harmsen et al. | 228/263 X |

FOREIGN PATENT DOCUMENTS 1433870  4/1976  United Kingdom .................... 219/118

Primary Examiner—E. A. Goldberg
Attorney, Agent, or Firm—Hugh R. Rather; William A. Autio; Michael E. Taken

[57] ABSTRACT

Submerged percussion welding is disclosed wherein the parts to be welded are in intimate contact with a liquid, such as water, during explosion and vaporization of the arc starter therebetween. In preferred form, one part is mounted to a stationary bottom electrode around which a movable water tank is raised to immerse the part. The other part, mounted to a movable top electrode, is brought into contact with the first part and the weld is completed under water.

21 Claims, 4 Drawing Figures

APPARATUS AND METHOD FOR SUBMERGED PERCUSSION WELDING

BACKGROUND OF THE INVENTION

The system of percussion welding is known in the art and generally operates as follows: first and second parts to be welded are clamped on top and bottom electrodes, one of the parts having a small projection called an arc starter; the parts are brought together with a very light pressure such that the arc starter of one part touches the other part; a large current is then passed through the arc starter; the arc starter cannot pass this current so it vaporizes (explodes) and an arc passes over the surfaces of both parts heating both surfaces; a follow-up force pushes the two hot surfaces together and the parts are welded.

One of the beneficial uses for percussion welding is in the attachment of electrical contacts to terminal members, especially in the attachment of so-called "non-weldable" contact material such as silver cadmium oxide (AgCdO). In electrical switching applications, it is desirable to use contacts which will not weld together and prevent opening of the circuit. On the other hand, however, such a "non-weldable" contact must somehow be attached to a terminal in order to make circuit connection. Such attachment is possible by percussion welding the contact to the terminal, whereas other types of welding, such as stud welding, induction welding, and resistance welding have been found unsuitable for such use.

The following table compares typical parameters involved in stud welding, induction welding, resistance welding, and percussion welding.

|  | Stud | Induction | Resistance | Percussion |
| --- | --- | --- | --- | --- |
| part porojectons | lg. cone | none | beveled edge | arc starter |
| current type | D.C. | A.C. high frequency | A.C. 60 cyc/sec | ½ cycle A.C. |
| current size | 200 Amp | 100 Amp | 20,000 Amp | 50,000 & Amp |
| current time | 15 Sec. | 3 Sec. | 3 Cyc. 49 mili sec. | 3 mili sec. |
| pressure | 400 lbs/ sq in | 700 lbs/ sq in | 300 lbs/ sq in | 100 lbs/ sq in* |
| pressure time | 2 Sec. | 50 mili sec. | 20 cyc 333 mili sec. | 50 mili sec. |
| arc | Yes | No | No | Yes |
| voltage | 32V | 3V | 4V | 24 + V |
| suitable for welding AgCdO | No | No | No | Yes |

*with follow-up force (e.g. magnetically induced) of 1000 lbs/sq in

Percussion welders, however, are subject to certain disadvantages. The explosion of the arc starter is extremely loud and soundproof boxes must be used or ear protection devices must be worn. For example, sound level measurements on a typical percussion welder in open air were recorded at about 127 decibels (dB). Occupational Safety and Health Administration (OSHA) Health Standard 1910.95 requires that exposure to impulse or impact noise not exceed 140 dB peak sound pressure level, and new standards proposed by OSHA include the following criteria for impact or impulse noise: 140 dB for not more than 100 impulses per day; 130 dB for not more than 1000 impulses per day; 120 dB for not more than 10,000 impulses per day.

Another disadvantage is that excess flash or molten material comes out the sides when the arc goes beyond the edges of the parts. In order to assure that the entire facing surface of each part is welded to the entire facing surface of the other part, the arc should spread to or just beyond the edges of the parts. However it is difficult to accurately control how far the arc spreads, and thus to ensure complete surface coverage, the arc is spread beyond the edges of the parts. The excess flash beyond the edges of the parts sticks to the tooling and equipment, thus requiring frequent cleaning, and necessitating intermittent interruption of an automated line. Also, the flash expulsion material is usually lost as scrap.

A further disadvantage is that gaseous vapors must be vented, requiring, for example, the provision of an exhaust fan system.

A still further disadvantage is the burn-off of part material due to arc-in, which can be financially significant especially when precious metal contacts are being welded.

While prior percussion welders have been useful for their intended purposes, the present invention relates to improvements thereover and alleviates the above-noted and other disadvantages.

SUMMARY OF THE INVENTION

This invention relates to an improved percussion welder including means for submerging the welding parts in a liquid during explosion and vaporization of the arc starter.

An object of the invention is to provide a welder of the aforementioned character which reduces noise to a level where ear protection devices are no longer needed.

Another object is to provide a welder of the aforementioned character wherein flash is greatly reduced and goes only slightly beyond the edges of the welded parts.

Another object is to provide a welder of the aforementioned character wherein flash expulsion does not stick to the tooling.

Another object is to provide a welder of the aforementioned character wherein flash expulsion does not stick to the parts and does not have to be broken off or removed by other means.

Another object is to provide a welder of the aforementioned character wherein flash expulsion material is collected in the container holding the liquid and may be reclaimed.

Another object is to provide a welder of the aforementioned character wherein gaseous vapors and fumes are collected in the liquid and then filtered out with a filter, thus alleviating the need for an exhaust fan system.

Another object is to provide a welder of the aforementioned character exhibiting a reduction of burn-off due to are-in.

A more specific object of the invention is to provide a welder of the aforementioned character having a stationary bottom electrode and a liquid holding container movable between positions submerging and exposing the bottom electrode whereby the percussive blow delivered by a movable top electrode to the bottom electrode may be absorbed by rigid stationary mounting means of the bottom electrode, and whereby to facilitate current commutation to the bottom electrode.

Another object of the invention is to provide an improved method of percussion welding comprising the step of submerging the parts to be welded in a liquid such that the parts are in intimate contact with the liquid at the time the arc starter explodes and vaporizes.

Other objects and advantages will hereinafter appear.

DESCRIPTION OF THE PREFERRED EMBODIMENT

Figure 1:
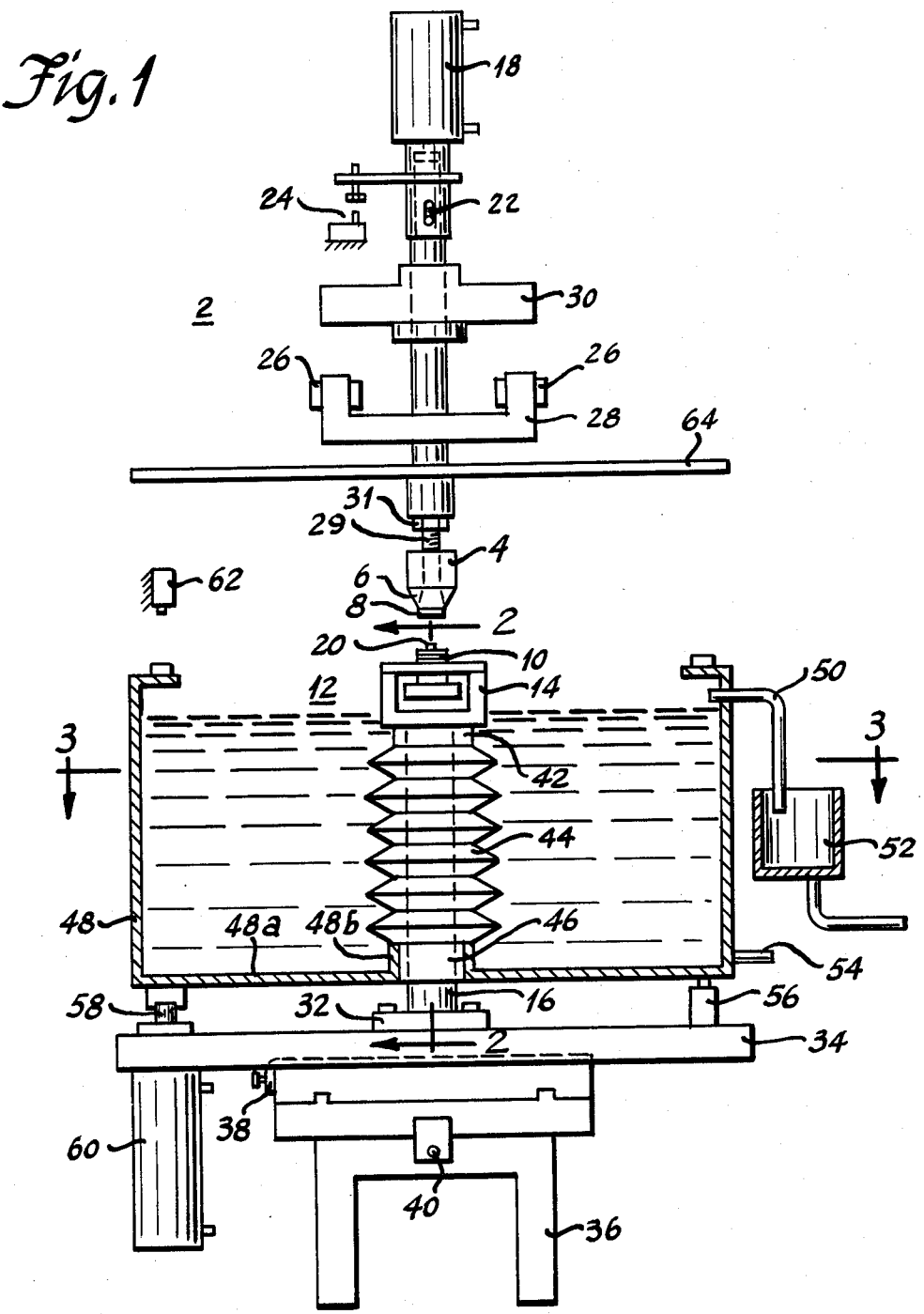
FIG. 1 is a plan view, partly in section of a percussion welder constructed in accordance with the invention.

There is shown in FIG. 1 a percussion welder constructed in accordance with the invention. A movable top electrode assembly, generally designated by the reference character 2, includes a clamp 4 and collet 6 for mounting a first part, such as an electrical contact 8, to be welded. A second part to be welded, such as an electrical terminal 10, is mounted to a bottom stationary electrode assembly 12 including a clamp tool 14 and electrode post 16.

Top electrode assembly 2 is known in the art and therefore is only shown schematically in FIG. 1 and will now be functionally described. A weld head air cylinder 18 is provided for raising and lowering electrode 2. Bottom electrode 12 is grounded and appropriate circuitry (not shown) is connected to top electrode 2 such that when parts 8 and 10 touch, an electrical circuit is completed through which, for example, a transformer is energized, and which exhibits the parameters hereinbefore noted for percussion welding. An arc starter 20 (exagerated for purposes of illustration) is formed on either part 8 or part 10. Referring to FIG. 1, when part 8 touches the arc starter 20 formed on part 10, the circuit is completed and the arc starter explodes because it cannot pass the large current being forced therethrough. The small gap created between parts 8 and 10 is quickly closed, as the arc passes across their surfaces, by follow-up force means producing a percussive blow. In preferred form, a magnetic follow-up force is used wherein a loosely coupled shaft 22 cooperates with a limit switch 24 to energize magnet coils 26 around magnet stator 28 during downward movement of electrode 2 whereby magnet armature 30 is attracted to supply the quick percussive blow needed.

The top electrode may be provided with a threaded portion 29 and a nut 31 for adjusting the height of the collet and clamp.

Bottom electrode 12 is rigidly mounted by means of bracket 32 to table top 34 of table 36 having left-right adjustment 38 and in-out adjustment 40 whereby to align part 10 with part 8. Mounted near the top of electrode post 16 below clamp 14 is a gasket type annual collar 42 which sealingly mounts the upper end of a rubber bellows 44. The bellows concentrically surrounds electrode post 16 and is vertically flexible in accordion-like manner. The bottom end of bellows 44 is sealingly mounted around an annular bearing sleeve 46 which concentrically surrounds and is vertically slidable along the electrode post.

A rectangular container 48 is open at the top and has a bottom wall 48a with a central circular aperture formed therein from which a cylindrical sleeve 48b extends upwardly and is rigidly and sealingly mounted around the bottom end of the bellows to bearing sleeve 46. The container may be filled with a liquid, such as water, which is kept at a constant level by drain 50 and overflow tank 52. An inlet 54 may also be provided for circulation of liquid in the container. While a rubber bellows has been disclosed, it can easily be appreciated that any other type of sealing means may be used to confine the liquid in the container.

Figure 2:
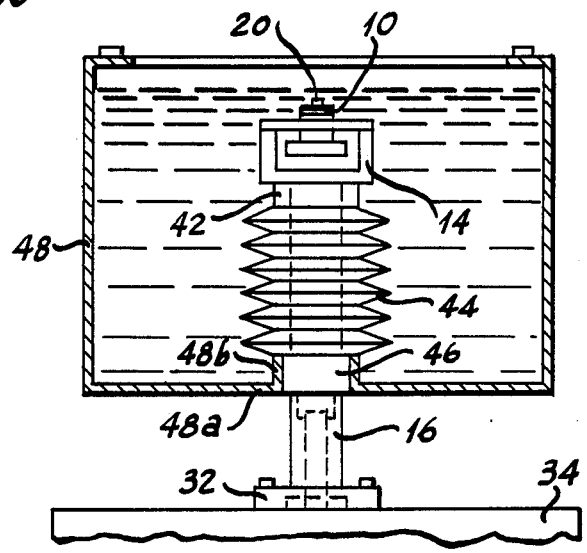
FIG. 2 is a cross-section view taken along line 2—2 of FIG. 1 showing the liquid container in a raised position to effect submersion.
Figure 3:
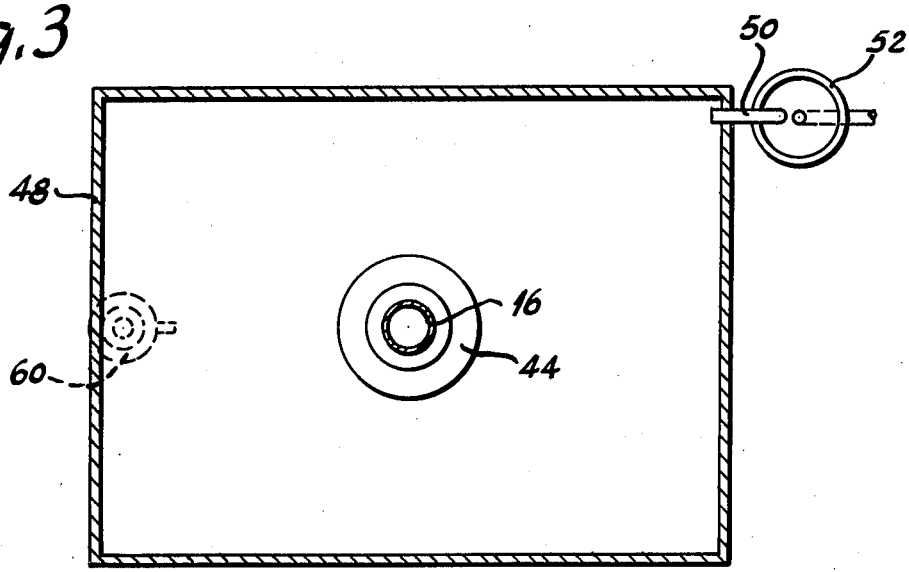
FIG. 3 is a cross-section view of the liquid container taken along line 3—3 of FIG. 1.

FIG. 1 shows the container in its lowered position resting on supports 56 and 58 on the table, and bellows 44 in an expanded condition. An air cylinder 60 is provided for raising the container to the position shown in FIG. 2 wherein the bellows is in a contracted condition and part 10 is submerged in the liquid. An up switch 62 may be provided and support 56 may include a down switch each of which may be appropriately connected to circuitry of electrode assembly 2 to coordinate operation of the welder. A splash cover 64 may be carried by electrode assembly 2, if desired, to cover the container during the welding operation.

Operation of the welder is as follows: the container is raised until part 10 is immersed in 2 to 3 inches of water; the top electrode assembly comes down; and the weld is completed under water.

Figure 4:
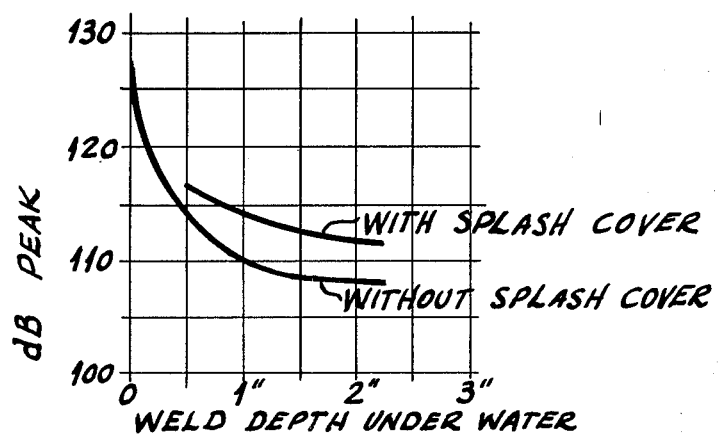
FIG. 4 is a graph of sound level in decibels versus submersion depth in inches.

It has been found that the present invention provides a significant reduction in noise level, exhibiting desirable attenuation characteristics. FIG. 4 graphically summarizes the data obtained in tests performed using a Bruel and Kjaer Sound Level Meter Model 2204. Noise readings were taken on the C-scale utilizing the peak hold feature. The microphone was 24 inches from the point of contact of parts 8 and 10, as close to the ear of the operator as possible without interfering with his work. Readings taken of the parts in open air were about 127.5 dB. Readings were taken of the parts at various depths, with and without a splash cover and are plotted on the graph. It is believed that the higher noise levels with a splash cover than without a splash cover are due to the additional element of vibration between the splash cover and container 48, reduction of which it is believed could be facilitated by use of a heavier splash cover to eliminate rattles, and possibly effect an even greater attenuation of noise level. If a splash cover is to be used at all, however, a lighter cover is preferred because it is deemed safer, e.g. to minimize or avoid injury to an observer's hand inadvertently placed in the area between the cover and tank as they engage, and because even with the light splash cover the sound level has been reduced well below the aforenoted proposed safety criteria, as shown by the graph in FIG. 4.

It has also been found that the present invention affords a simple means to accurately control flash expulsion, and, as a corollary, to enhance the consistency and strength of the weld. It is desirable to weld the entire bottom surface area of part 8 to the entire top surface area of part 10 with no gaps therebetween. This can be assured by having the flash come out the sides around the entire perimeter of the joint between the parts whereby it is assured that the parts have been welded all the way to their edges. It is also desirable, however, to keep the tooling, parts, etc., clean and free of excess flash. The present invention achieves both of these heretobefore incompatible results. It has been found that the flash has been greatly reduced and goes just a little beyond the edge of the parts which is what is desired. Furthermore, it has been found that the flash expulsion does not stick to the tooling or the parts. An ancillary benefit of the present invention is the collection of expulsion material in the bottom of the container for subsequent reclamation.

The present invention eliminates the need for an exhaust fan system because it has been found that the vapors and fumes are collected in the water and may then be filtered out with a water filter.

It has also been found that burn-off due to arc-in has been reduced. For example, using the present invention to weld a ⅜ inch diameter AgCdO contact to 0.080 inch thick copper terminal, it was found that the amount of material burned off due to the arc was reduced by 0.003 to 0.004 inch.

The aforegoing description is not intended to be limiting and it is recognized that various modifications are possible within the scope of the invention defined in the appended claims.

I claim:

1. In combination with a percussion welder, wherein a pair of parts to be welded are carried by a pair of electrodes, one of said parts having a small projection to act as an arc starter, said parts being brought together such that said arc starter touches the other of said parts and a means to pass a large current through said arc starter such that said arc starter explodes and vaporizes and an arc passes across facing surfaces of said parts, and including means applying a follow-up force pushing said facing surfaces together to instantaneously close the gap created between said facing surfaces by said explosion of said arc starter, whereby said parts are welded, the improvement comprising:

a container;
liquid confined in said container;
means for submerging said parts in said liquid such that said parts are in intimate contact with said liquid during explosion and vaporization of said arc starter.

2. The invention defined in claim 1 wherein said pair of electrodes comprises a vertically reciprocal top electrode movable toward and away from a bottom electrode, and wherein said container is open-topped and has a bottom wall with an aperture through which said bottom electrode extends, said means being operable to effect relative vertical motion between said bottom electrode and said container such that in a first position the part carried by said bottom electrode is submerged in said liquid and in a second position said part carried by said bottom electrode is above said liquid.

3. The invention defined in claim 4 wherein said bottom electrode is stationary and wherein said means is operable to raise and lower said container such that said part carried by said bottom electrode is submerged in said liquid when said container is in a raised position and such that said part carried by said bottom electrode is above said liquid when said container is in a lowered position.

4. In combination with a percussion welder, wherein a pair of parts to be welded are carried by a pair of electrodes, one of said parts having a small projection to act as an arc starter, said parts being brought together such that said arc starter touches the other of said parts and a large current is passed through said arc starter such that said arc starter explodes and vaporizes and an arc passes across facing surfaces of said parts whereafter a follow-up force pushes said facing surfaces together and said parts are welded, the improvement comprising:

a container;
liquid confined in said container;
means for submerging said parts in said liquid such that said parts are in intimate contact with said liquid during explosion and vaporization of said arc starter;
wherein said pair of electrodes comprises a vertically reciprocal top electrode movable toward and away from a bottom electrode, and wherein said container is open-topped and has a bottom wall with an aperture through which said bottom electrode extends, said means being operable to effect relative vertical motion between said bottom electrode and said container such that in a first position the part carried by said bottom electrode is submerged in said liquid and in a second position said part carried by said bottom electrode is above said liquid; and
liquid-tight sealing means disposed between said bottom electrode and that portion of said bottom wall of said container defining said aperture whereby said liquid is retained in said.

5. The invention defined in claim 4 wherein said sealing means comprises an elongated rubber bellows concentrically surrounding a portion of said bottom electrode, said bellows being sealing mounted at its top end to a mid-section of said bottom electrode and sealing mounted at its bottom end to said portion of said bottom wall of said container defining said aperture such that said bellows is expanded and contracted in accordion-like manner in response to said relative vertical motion.

6. The invention defined in claim 5 wherein said bottom electrode comprises an elongated cylindrical member, and further comprising an annular bearing slidably fitted around said bottom electrode and sealingly mounted to said portion of said bottom wall of said container defining said aperture.

7. The invention defined in claim 4 wherein said container has an overflow pipe in a side wall thereof for maintaining a constant liquid level in said container and wherein said container further has an inlet pipe for supplying liquid into said container.

8. The invention defined in claim 4 wherein said means comprises a mechanical actuator actuatable to exert an upward force on said container and deactuatable to permit lowering of said container under the influence of gravity.

9. The invention defined in claim 8 wherein said means comprises an air cylinder.

10. The invention defined in claim 4 further comprising a mounting table having a table top to which said bottom electrode is rigidly mounted and to which a plurality of supports are mounted for supporting said container in said lowered position, and further comprising adjusting means for laterally moving said table top leftwardly and rightwardly and forwardly and rearwardly with respect to said mounting table whereby to vertically align said top and bottom electrodes.

11. The invention defined in claim 4 further comprising a splash cover cooperable with said container for covering the latter during said explosion and vaporization of said arc starter.

12. The invention defined in claim 4 wherein said liquid is water.

13. The invention defined in claim 4 wherein one of said parts is made of "non-weldable" material, such as AgCdO.

14. The invention defined in claim 4 wherein the peak sound pressure produced by said explosion and vaporization is less than about 120 decibels at a point external of said liquid and spaced about two feet from said parts, when said parts are submerged in said liquid to a depth of about one-quarter inch or more.

15. The invention defined in claim 11 wherein said peak sound pressure is less than about 110 decibels when said parts are submerged to a depth of about one inch or more.

16. The invention defined in claim 4 wherein the peak sound pressure produced by said explosion and vaporization of said arc starter is attenuated by about 7.5 decibels or more when said parts are submerged in said liquid to a depth of about one-quarter inch or more than when said parts are in air.

17. The invention defined in claim 16 wherein said peak sound pressure is attenuated by about 17.5 decibels or more when said parts are submerged to a depth of about one inch or more than when said parts are in air.

18. The invention defined in claim 1 wherein said liquid impedes the expulsion of molten material in the form of flash due to said explosion and vaporization of said arc starter such that said flash is expelled only slightly beyond the perimeteral edges of said facing surfaces.

19. The invention defined in claim 18 wherein said expelled flash is solidified by said liquid and collected in said container for subsequent reclamation, said liquid preventing adherence of said flash to said electrodes.

20. The invention according to claim 4 wherein said liquid collects gaseous vapors and fumes produced by said explosion and vaporization.

21. In combination with the method of percussion welding comprising the steps of:
providing a pair of parts to be welded;
providing a small projection on one of said parts to act as an arc starter;
providing a pair of electrodes;
supporting said parts on said electrodes;
bringing said electrodes toward one another such that said arc starter touches the other of said parts;
passing a large current through said arc starter such that said arc starter explodes and vaporizes whereby an arc passes across the facing surfaces of said parts; and
applying a follow-up force pushing said facing surfaces together to instantaneously close the gap created between said facing surfaces by said explosion of said arc starter, to complete the welding of said parts;
the improvement comprising the step of:
submerging said parts in a liquid such that said parts are in intimate contact with said liquid at the time said arc starter explodes and vaporizes.

* * * * *